United States Patent [19]

Davenport

[11] 4,012,016
[45] Mar. 15, 1977

[54] AUTONOMOUS VARIABLE DENSITY AIRCRAFT

[75] Inventor: Arthur Clyde Davenport, New Orleans, La.

[73] Assignee: Dynapods, Inc., New Orleans, La.

[22] Filed: Sept. 15, 1975

[21] Appl. No.: 613,640

[52] U.S. Cl. .................... 244/97; 244/98; 244/125; 244/128

[51] Int. Cl.² .................... B64B 1/62

[58] Field of Search ............ 244/30, 33, 31, 96–99, 244/125, 128; 55/70; 220/67; 206/.7

[56] References Cited

UNITED STATES PATENTS

| | | | |
|---|---|---|---|
| 1,216,059 | 2/1917 | Bosch | 55/70 |
| 1,665,886 | 4/1928 | Lempertz | 244/61 |
| 1,755,359 | 4/1930 | Moses | 244/97 |
| 1,972,242 | 9/1934 | Morse | 244/97 |
| 2,094,619 | 10/1937 | Reichert et al. | 244/128 |
| 2,500,291 | 3/1950 | Liebel et al. | 55/70 |
| 2,663,626 | 12/1953 | Spangler | 206/.7 |
| 3,038,285 | 6/1962 | Mavrovic | 55/70 |
| 3,350,229 | 10/1967 | Justi | 206/.7 |
| 3,661,290 | 5/1972 | Davenport | 220/6 |

*Primary Examiner*—Trygve M. Blix
*Assistant Examiner*—Galen L. Barefoot
*Attorney, Agent, or Firm*—Sughrue, Rothwell, Mion, Zinn & Macpeak

[57] ABSTRACT

A variable density aircraft is formed of at least one variable volume container such as a balloon, gas cell, or collapsible hinged panel hull which is supplied with a gas for container expansion and comtraction by an aircraft carried reversible, fluid expansion/contraction system. The variation of the volume of such containment device without a commensurate variation of mass results in a densemetric variation in the aircraft.

9 Claims, 3 Drawing Figures

AUTONOMOUS VARIABLE DENSITY AIRCRAFT

BACKGROUND OF THE INVENTION

1. Field of the Invention

This invention relates to an improved variable density aircraft, and more particularly to an autonomous aircraft capable of ready change from an aerodyne to an aerostat.

2. Description of the Prior Art

Aircraft are generally classified as aerodynes, that is heavier than air aircraft (HTA) or aerostats, that is lighter than air aircraft (LTA) according to their comparative density relative to the atmosphere.

The common characteristic of all aerodynes is that they must continuously expend energy to maintain steady state flight. Aerodynes consume relatively large quantities of energy because of their requirement for a continuous kinetic energy input to achieve and maintain flight.

The common characteristic of aerostats as represented by th rigid, non-rigid, semi-rigid airships and captive LTA gas balloons is that they maintain a density altitude by the potential energy of the LTA gases contained in their hulls. They float at their altitude of equilibrium. Actually, they are misnomered as they are neither HTA nor LTA, but in reality of the same density of the air in which they float. Powered aerostats consume relatively small quantities of energy as they do not require kinetic energy to overcome the force of gravity. Unfortunately, the density of the atmosphere is inconsistent and weight variations due to normal aerostat operations introduce density variations which must be compensated for as the density of an object is its mass to volume ratio. An aerostat's density may be varied by varying its mass or its volume.

Prior LTA gas aerostats use an unsatisfactory, irreversible mass variation system for aerostatic density change. Such systems involve either the concept of ballast dropping or the employment of gas valving to release gas to the atmosphere from the captured gas chambers or a combination of the two. This system of aerostatic vertical control was invented by Professor J. A. C. Charles in 1783 and incorporated into airships when they appeared on the scene. Its irreversibility has prevented the airship from attaining its full potential because it denies the airship autonomy. Airships using the mass variation vertical control system are hampered by their requirements of ballast aboard the airships, gas generation, storage and release systems and large ground crews at the departure points and destinations for literally holding down the airship. The airship must be driven from a higher altitude to a ground level by propulsive flight to the point where the ground crews grasp lines trailing from the airship to literally hold the airship adjacent the ground as a tethered aircraft.

The object of the present invention is to remove all of these constraints from an airship by the incorporation of an on board reversible variable density control system providing true autonomy to the aircraft and the creation of a variable density aircraft which may be readily changed from HTA to LTA and vice versa.

The mass variation system of Professor Charles has been in continued use for nearly two centuries because it has been generally accepted as a fact that the variation of the density of the aerostat volumetrically would incur prohibitive weight penalities due to temperature and/or pressure extremes involved in the significant volumetric reversible variations of most LTA gases. The most significant reversible volumetric variations in matter occur during their changes of state from liquid to vapor (vaporization/condensation) or from solid to gas (sublimation/solidification). Water, for example, varies from a liquid weighing 59.8 pounds per cubic foot to a gas weighing 0.0373 pounds per cubic foot during its vaporization at 212° F (100° C). This is a volumetric variation of 1,603 to 1. The problem with water as a reversible aerostatic vertical control system component is that it condenses too readily and requires a continuous input of heat energy to maintain it in the gaseous state. An airship employing such a system would in reality be an HTA aircraft.

However, an investigation of the lighter than air gases has shown ammonia as an LTA gas which has an exceptional affinity for water. One cubic foot of water at 20° C under one atmospheric pressure (1 ATM) will absorb approximately 700 cubic feet of ammonia. The same cubic foot of water at 32° F (0° C) under one ATM of pressure will absorb 1,250 cubic feet or 56.1 pounds of ammonia gas. Pure ammonia gas at 32° F requires 4.23 ATMS to liquify and one cubic foot of this saturated liquid ammonia only weighs 39.87 pounds. Further, 1 cubic foot of saturated aqua-ammonia at 32° F under 1 ATM contains 1.4 times as much ammonia as 1 cubic foot of the pure liquid at the same temperature but under more than four times as much pressure. This amazing solubility of ammonia in water is enhanced by the fact that light pressurization results in considerably larger concentrations of ammonia in the solution. The rate of absorption of the ammonia gas into the water varies with the amount of water surface area exposed to the gas, the temperature of the water and gas, and the pressure under which the solution is prepared. The rate of absorption may be very rapid where the gas is diffused into the water or the water is sprayed into the gas. An additional useful characteristic particularly to the present invention is that by elevating the heat of the solution to 100° C, all of the ammonia gas is driven out of the solution and can be isolated separate from the water as a gas under normal atmospheric temperatues.

Investigations have shown that during the variation of temperature from 0° to 100° C, and the reduction of pressure from 2.37 ATMS to 1 ATM the volume of one cubic foot of saturated aqua-ammonia increases to 2,431 of gas and one of water. This represents a density variation of from 172 pounds per cubic foot to 0.0707 pounds per cubic foot which is 0.0047 pounds per cubic foot lighter than air. Thus, the present invention involves the discovery of the existence of a working fluid having its exceptional volumetric variability within relatively narrow temperature/pressure ranges closely related to the earth's environmental temperature/pressure ranges which permits the creation of a volumetric density variation system for aerostats which is both practical and realizable.

Applicant has developed a variable configuration, variable volume articulated vessel particularly applicable to the aircraft field which may advantageously change its configuration and volume to reduce aerodynamic drag and to meet the changing pressure of the air due to altitude variation. Such multiple section articulated vessel forms the subject matter of U.S. Pat. No. 3,661,290.

It is a further object of this invention to provide a volumetric density variation system for an aerostat formed of a variable configuration, variable volume articulated vessel constructed of relatively rigid panels hinge joined along rectilinear edges thereof.

SUMMARY OF THE INVENTION

The autonomous variable density aircraft of the present invention comprises an aircraft body which itself may define a variable volume container, and means carried by the body for varying the volume of the container by selectively feeding ammonia gas to and removing ammonia gas from said container.

Preferably, the aircraft body carries a further container of water and pumping means for diffusing ammonia gas from the variable volume container to the water container for pumping ammonia gas from the variable volume container into the water container and diffusing ammonia gas therein in an aqua-ammonia solution and means for increasing the temperature of the container of solution for driving ammonia gas from the solution and feeding it to the variable volume container. The variable volume container may comprise a compartment within the variable volume aircraft body and a high volume low pressure compressor may act to effect flow of gaseous ammonia from the variable volume compartment to the solution storage tank. A closed loop refrigeration system which employs ammonia gas as the refrigerant permits ammonia gas from the variable volume container to be compressed, condensed to liquid form and expanded through an expansion valve to cool the solution within the storage tank by means of an evaporator coil positioned therein with the ammonia gas returned to the variable volume container from the evaporator after being cooled by the atmosphere.

Preferably, the aircraft comprises an articulated vessel of variable configuration and volume constructed of relatively rigid panels which are hinge joined along rectilinear edges and which at least partially defines the variable volume container. Flexible partitions within the articulated vessel may separate the vessel interior into a first compartment for the ammonia gas, a second compartment housing a payload such as a hydrocarbon fuel gas, and a third compartment housing a lifting gas. A fuel gas heater operatively associated with the solution storage tank may advantageously receive fuel from the hydrocarbon fuel gas compartment. Multiple flexible panels may be employed within the articulated vessel defining the variable volume aircraft ammonia gas compartment, the fuel gas compartment and a lifting gas compartment supplied with a given mass of helium or hydrogen. The increase or decrease of ammonia gas within the ammonia gas compartment may effectively be employed to change the aircraft from a lighter than air vehicle to a heavier then air vehicle.

DESCRIPTION OF THE PREFERRED EMBODIMENT

Figure 1:
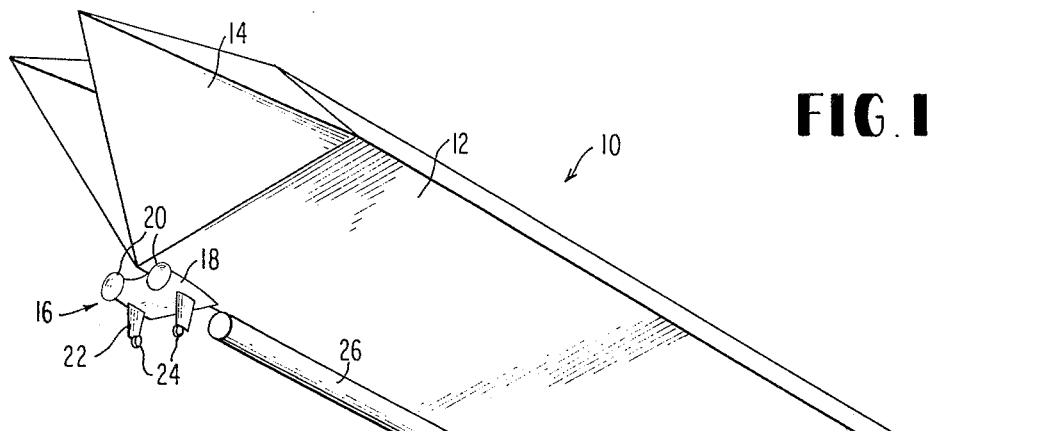
FIG. 1 is a perspective view of the autonomous variable density aircraft of the present invention in the form of an articulated vessel of variable configuration and formed of relatively hinged joined, relatively rigid panels.
Figure 2:
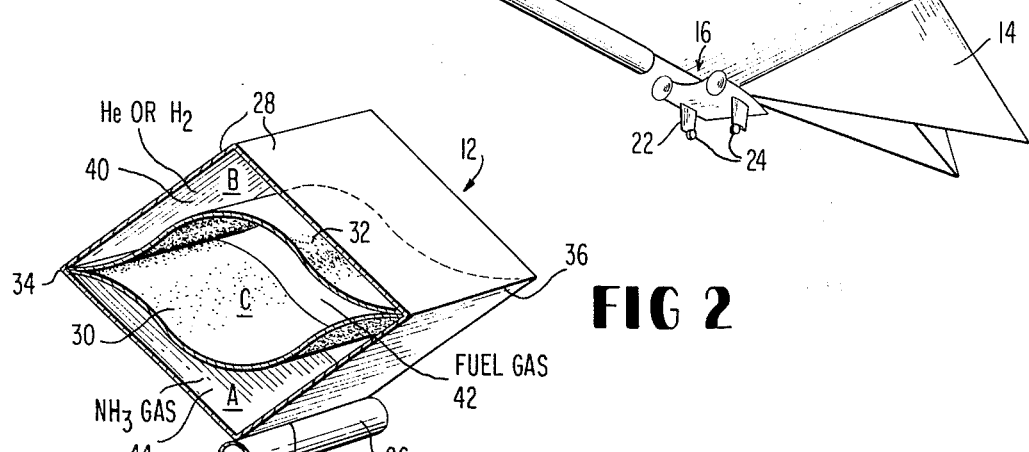
FIG. 2 is a fragmentary, enlarged perspective view of a portion of the aircraft of FIG. 1 illustrating the multiple gas chambers thereof.

Referring to FIGS. 1 and 2, a preferred embodiment of the present invention takes the form of an articulated vessel 10 of variable configuration comprised of three sections, an intermediate section 12 and identical end sections 14 at either end thereof, the articulated vessel being of a type shown in the referenced patent. In this respect, the end sections 14 are essentially identical to section 1 of FIG. 1 of U.S. Pat. No. 3,661,290 and in that respect, the end sections upon contraction and reduced volume of the aircraft 10 develop pointed ends markedly reducing drag on the aircraft regardless of its direction of movement. The aircraft 10 is illustrated as including paired landing gear assemblies 16 at respective ends of section 12 at the bottom thereof, the assemblies 16 also being provided with propulsion means such as hydrocarbon fuel driven turbo-engines 18 driving propellers 20 for propelling the aircraft in a longitudinal direction either by pushing or pulling the aircraft, depending upon the configuration and nature of the propulsion system. Vertical legs 22 of the assemblies 16 carry wheels as at 24 for supporting the aircraft on the ground.

Extending longitudinally beneath section 12 is an elongated storage tank 26 which is of tubular configuration carries and acts to house a mass of water employable as a component of the variable density system of the present invention.

In FIG. 2, a fragmentary portion of hull section 12 may be seen as comprised of four essentially rigid rectangular panels 28 hinge joined at their edges to form a rectangular expansible and contractible boxlike assembly, the interior of the hull section 12 being separated, respectively, into chambers or compartments A, B and C by a pair of flexible sheets 30 and 32. The sheets are formed of gas impervious pliable film formed of plastic or the like which is non-stretchable and non-expandable. The sheets are joined at their ends and fixed to opposed lateral corners 34 and 36 of the section 12, while the lower corner 38 of the hull supports the tubular storage tank 26. The flexible or pliable film sheets 30 and 32 are of a width such that depending upon the relative pressures within chambers A, B and C, defined by the panels 28 and the flexible sheets 30 and 32, the sheets may in fact be pressed against the inner walls of the panels and of course may be pressed together whereby any one of the chambers A, B and C may be selectively and totally compressed. Preferably, chamber B carries a lifting gas such as helium or hydrogen, while compartment C preferably carries a hydrocarbon fuel gas having approximately the same density as air so that the weight of the vehicle will not change with fuel consumption. The present invention involves the utilization of chamber or compartment A within which the ammonia gas is fed or extracted to perform the function of changing the density of the aircraft and its configuration, this being effected by change in volume but without change in mass. Advantageously, the ammonia gas 44 within compartment or chamber A may pass to and from the storage tank 26 which also functions, as mentioned previously, as the keel for the aircraft providing attitude stability by means of gravity effect.

Under the preferred operation of the aircraft 10 of the present invention, compartment B is provided with a given mass of a lifting gas such as hydrogen or helium as at 40 to just barely support the vehicle in empty weight configuration. Under this arrangement compartment C would carry a payload in terms of a hydrocarbon fuel gas 42 having a density ratio of 1 with air and thus as fuel is used during transfer of the ammonia gas 44 from compartment A, to the water storage tank 26 and vice versa, and for propelling the aircraft 10, and its utilization would not vary the density of the aircraft. Under such circumstances, the hydrogen or helium lifting gas 40 is of constant mass and the essence of the invention, therefore, is the employment of the change in volume of the ammonia gas 44 within chamber A as the means for changing the density of the aircraft, particularly, to change the aircraft from an HTA on the ground to an LTA, totally eliminating the necessity of diving of the craft during descent and the utilization of mooring lines and the like to hold the craft down, since it would slowly change from LTA to HTA during descent and vice versa.

Figure 3:
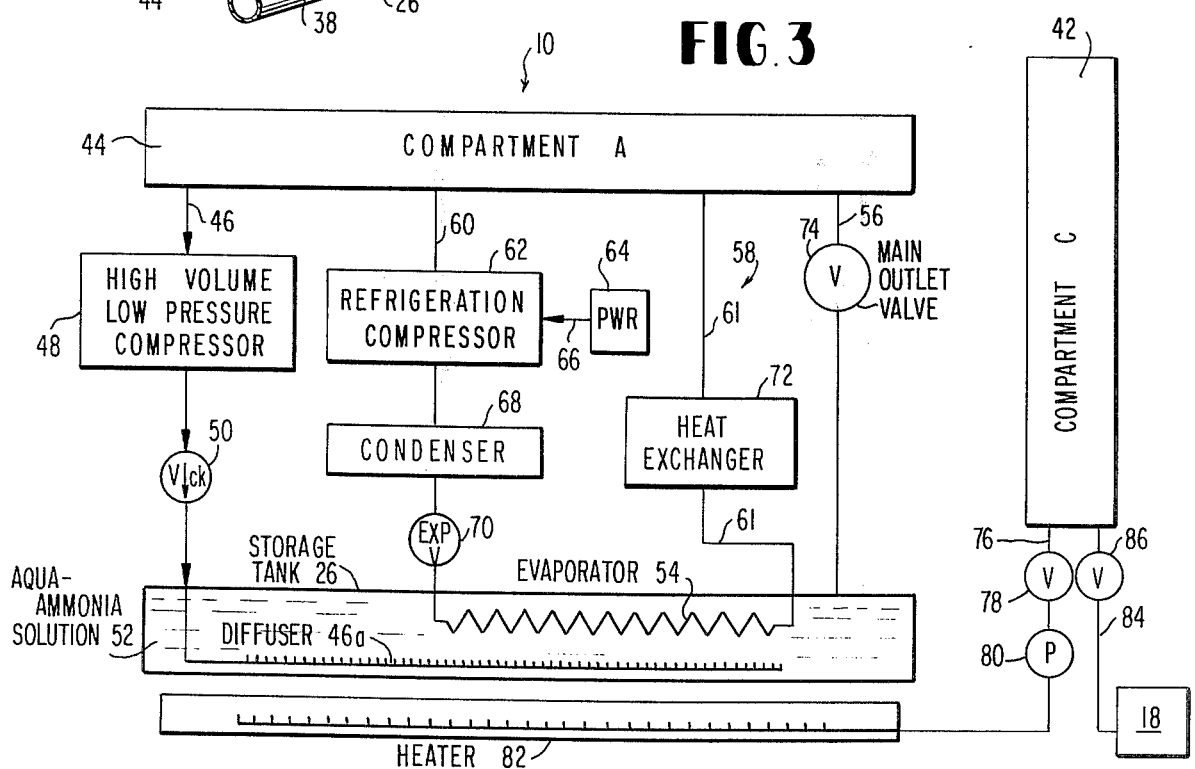
FIG. 3 is a schematic diagram of one form of a reversible, fluid expansion/contraction system for changing the density of the aircraft of FIGS. 1 and 2.

In order to effect this variation in density in a reversible fashion, the present invention preferably makes use of the system illustrated in FIG. 3. In that regard, the block form schematic diagram shows compartment A as a large rectangular block which forms a part of the aircraft 10 and houses ammonia gas 44, while the lower rectangular block schematically illustrates the tubular storage tank 26. The system incorporates a first line or conduit 46 leading from compartment A to the storage tank 26 and being provided with a high volume, low pressure compressor 48, preferably of the axial flow variety, line 46 being closed off by a check valve 50 so as to prevent return of ammonia gas from the storage tank 26 to compartment A by way of line 46. The line 46 terminates within the water storage tank 26 in a diffuser section 46a which may, for illustrative purposes, simply constitute a perforated pipe. Of course, more sophisticated means may be provided for diffusing the ammonia gas within the aqua-ammonia solution 52. The solution 52 may fill the major portion of the storage tank 26 at least to the extent where it covers the evaporator coil 54 of a refrigeration circuit which employs the ammonia 44 as the refrigerant working fluid. The storage tank 26 is further provided with an outlet or return line or conduit 56 permitting gaseous ammonia 44 after being given up by the solution to return to compartment A after being driven therefrom.

A closed loop refrigeration system is identified generally at 58 and as a compartment thereof includes compartment A as it utilizes the ammonia gas 44 as the refrigerant. Within the closed loop refrigeration system 58, in series fashion, and connected by a conduit or line 60, in the direction of ammonia gas flow from compartment A, in order, is a compressor 62 which may be powered by an electric motor 64 through a mechanical gear train 66 for instance. Preferably, the power unit for the compressor comprises an internal combustion engine using the fuel gas 42 as its power source. The ammonia gas 44 is compressed from the relatively low pressure of compartment A into a much higher pressure for delivery to a condenser 68 downstream thereof, the condenser 68 being positioned in heat exchange relation with the ambient air, external of the aircraft for condensing of the high pressure refrigerant into liquid form, where it subsequently expands through expansion valve 70 and removes heat from the aqua-ammonia solution 52 within storage tank 26 by way of heat transfer within the coils of the evaporator 54, prior to returning through line 61 to compartment A after vaporization. The gaseous ammonia has its temperature reduced or increased by heat exchanger 72 located external of the aircraft 10 for heat exchange with the ambient air. The closed loop refrigeration system 58 is quite standard with the compressor, condenser, expansion valve, evaporator and heat exchanger, all being standard refrigeration components. The purpose of the closed loop refrigeration system 58 is to chill the solution 52 within the storage tank 26 which permits the gas transferred through line 46 from compartment A to the water storage tank 26 to go into solution with the water and become ammonia hydroxide. By keeping the aqua-ammonia solution and the water (when there is no ammonia in it) at a temperature near 32° F, it will absorb the maximum amount of ammonia gas possible. A main outlet valve 74 is positioned within the line 56 leading from the storage tank 26 to compartment A for controlling the flow of ammonia gas from the storage tank 26, after separation from the aqua-ammonia solution 52, to compartment A.

In order to drive the ammonia gas from the aqua-ammonia solution 52 within the storage tank 26 and thus increase the volume of the aircraft by expanding the chambers within panels 28, changing the configuration of section 12 of the chamber from a flattened configuration to a rectangle in cross-section, the aqua-ammonia solution 52 must have its temperature raised. This is advantageously effected by bleeding fuel gas 42 within chamber C defined by the flexible sheet 30 and 32 from that chamber and burning the same beneath the storage tank 26. Schematically, the fuel gas 42 within compartment C passes by way of fuel line 76, a control valve 78 and a fuel pump 80 to a gas heater 82. Again, the heater is conventional, with the exception that due to the nature of the configuration of the aircraft in FIG. 1, the heater is such that it extends longitudinally, preferably the complete length of the tubular storage tank 26 so as to effect optimization of heat transfer from the heater 82 to the aqua-ammonia solution within the storage tank 26.

Further, the fuel compartment C may have a second fuel line 84 extending therefrom, within which is positioned a control valve 86, with line 84 terminating at the multiple internal combustion engines 18 acting to drive the propellers 20 which propel the craft. Thus, the ignition of the fuel 42 within the heater 82 elevates the temperature of the solution 52 within the tank 26 and drives the ammonia gas 44 from the storage tank 26 back into compartment A through main outlet valve 74 and line 56. Once the desired quantity of ammonia gas is driven out of the aqua-ammonia solution 52, the main outlet valve 74 is closed and with the check valve 50 closed, the ammonia vapor separated from the aqua-ammonia solution is simply maintained above the level of the solution 52 within tank 26. Reabsorption can take place only in terms of that amount of ammonia gas within the storage tank above the level of solution 52 unless the high volume compressor 48 is energized to force ammonia vapor from compartment A through check valve 50 and back to the storage tank 26.

While the illustrated embodiment shows the various compartments A, B and C, taking place within the central section 12 of the aircraft 10, it is obvious that the individual compartments A, B and C may extend into the end sections 14 or the articulated vehicle can have separate storage compartments wtihin all three sections.

The illustrated embodiment provides a natural application of a variable density aircraft in the transport for transport of a lighter than air commodity such as natural gas. During the transport mission, the natural gas is used both as the fuel for propulsion and the lifting gas. Since the natural gas is lighter than air, the full volume of the hull, absent compartment A, may be occupied by natural gas evenly divided between compartments B and C. This results in a safety feature for the aircraft in the event of holing of either the upper or lower hull panels. During the unloading of the gas from chambers B and C, the variable density mixture in the storage tank 26 would be depressurized and heated to expand it to the extent necessary to compensate for the loss of weight being experienced by the extraction of the natural gas. When the quantity of gas remaining in the aircraft hull is that required for the return trip to the natural gas pick up point, the variable density aircraft 10 is ready for the return flight. If returned unloaded, it will do so in a greatly reduced frontal area configuration resulting from the unloading of the natural gas. At the natural gas pick up point, the process is reversed and the variable density mixture is absorbed and compressed back into the chilled water forming the solution 52. The worldwide availability of water and ammonia at reasonable expense enchances the practicability of the mixture. Even more importantly, the rapidity at which chilled water absorbs ammonia when properly exposed to it allows its use as a means for volumetric reduction in the event that a load is dropped inadvertently or has been dropped because of some unfortunate circumstance. While the illustration of the aircraft 10 in FIG. 1 is purposely schematic, it is envisioned that for adequate low or zero air speed control, the variable density aircraft 10 would utilize power plant, rudder and elevator control pods (not shown) mounted at both ends of the lower keel of the hull central section 12, the keel of course being the storage tank for the mixture 52. The rudders and elevators would be directly behind the propellers for maximum effect. Cargo/passenger pods and external sling and winching provisions (not shown) would be mountable to the storage tank or kneel 26 or through the storage tank 26 to an internal keel in some configurations.

From tables 1 and 2 below, it may be seen that by applying a lighter than air gas ammonia, 1 cubic foot of saturated aqua-ammonia at 0° C under 1 ATM contains 1.4 times as much ammonia as 1 cubic foot of pure ammonia liquid at the same temperature when under more than four times as much pressure.

Table 1

Solubility of $NH_3$ in Water

| Press $NH_3$ ATMS | mm | 0° C 9/9 | 0° C $Cm^3/Cm^3$ | 20° C 9/9 | 20° C $Cm^3/Cm^3$ | 40° C 9/9 | 40° C $Cm^3/Cm^3$ |
|---|---|---|---|---|---|---|---|
| .92 | 700 | | | 0.497 | 652.9 | | |
| 1.05 | 800 | | | 0.544 | 714.6 | 0.329 | 429.6 |
| 1.18 | 900 | .997 | 1312 | 0.588 | 772.4 | | |
| 1.32 | 1000 | 1.094 | 1440 | 0.629 | 826.2 | 0.386 | 504.0 |
| 1.45 | 1100 | 1.192 | 1569 | 0.669 | 878.8 | | |
| 1.58 | 1200 | 1.288 | 1695 | 0.707 | 928.8 | 0.433 | 565.4 |
| 1.71 | 1300 | 1.388 | 1827 | 0.745 | 978.7 | | |
| 1.84 | 1400 | 1.488 | 1958 | 0.781 | 1025.9 | 0.472 | 616.3 |
| 1.97 | 1500 | 1.588 | 2090 | 0.815 | 1070.6 | | |
| 2.11 | 1600 | 1.688 | 2221 | 0.847 | 1112.6 | 0.508 | 663.3 |
| 2.24 | 1700 | 1.788 | 2340 | 0.877 | 1152.1 | | |
| 2.37 | 1800 | 1.847 | 2431 | 0.906 | 1190.1 | 0.543 | 709.0 |
| 2.5 | 1900 | | | 0.934 | 1226.9 | | |
| 2.63 | 2000 | | | 0.959 | 1259.7 | 0.577 | 753.4 |
| 2.76 | 2100 | | | 0.984 | 1292.6 | | |
| 2.89 | 2200 | | | 1.007 | 1322.8 | 0.611 | 797.8 |
| 3.04 | 2300 | | | 1.029 | 1351.7 | | |

Table 2

Solubility of Gases in Water
(By Volume at Atmospheric Pressure)

| t(deg F) | 32 | 68 | 212 |
|---|---|---|---|
| Air | 0.032 | 0.020 | 0.012 |
| Ammonia | 1250 | 700 | — |
| Hydrogen | 0.023 | 0.020 | 0.018 |

This high solubility of ammonia in water, as seen from Table 3 is enhanced by the fact that light pressurization results in considerably larger concentrations of ammonia in the solution. The rate of absorption of the ammonia gas into the water varies with the amount of water surface exposed to the gas, the temperature of the water and the gas, and the pressure under which the solution is prepared. The rate of absorption can be rapid where the gas is diffused into the water or the water sprayed into the gas. The illustrated embodiment of invention shows gas diffusion in the water. However, the system could be modified to incorporate a pump within the storage tank for spraying of the water (solution) into the vapor. An additional useful characteristic of the solution 52 is that by elevating its temperature to 100° C, all of the ammonia gas is driven out of the solution and can be isolated as a gas under normal atmospheric conditions. By varying the temperature from zero to 100° C and the pressure from 2.3 ATMS to 1 ATM, the volume of one cubic foot of saturated aqua-ammonia increase to 2,431 cubic feet of gas and one cubic foot of water. This represents a density variation or change from 175 pounds per cubic foot to 0.0707 pounds per cubic foot which is 0.0047 pounds per cubic foot LTA. Furthermore, under the operation of the present system, the 1 cubic foot of water is still on board the aircraft within the storage tank for use as disposable ballast in an emergency.

The operation of the present invention can be best appreciated by a brief description of a preferred mode. Prior to flight, the aircraft 10 is initially positioned on the ground surface resting on wheels 24 as the compartment B is filled with an insufficient amount of LTA gas such as hydrogen or helium as at 40 to place the aircraft in equilibrium, thus leaving it slightly HTA.

Additionally, compartment A is empty and the film 30 is lying against the lower surfaces against the internal surfaces of the lower two panels 28 of the diamond shaped hull 12. The storage tank 26 contains a saturated aqua-ammonia solution 52 and compartment C contains fuel both for the burner 82 and for the aircraft propulsion engines 18. All components of the system and the fluid contents are at ambient temperature including the aqua-ammonia solution 52 within storage tank 26.

When ascent is desired, the valve 78 is opened and the fuel pump 80 energized to pump fuel from the compartment C to the heater 82. Burning of the fuel by the heater 82 causes the temperature of the aqua-ammonia solution 52 to increase. Opening of the main outlet valve 74 permits the ammonia gas driven from the solution 52 to enter compartment A, this gas increases the volume within compartment A, causing the hinged panels 28 to pivot. The upper panels move away from the lower panels expanding the total chamber volume as defined by the four panels with the upper two panels 28 moving away from the pivot axis 38 of the lower two panels and the storage tank 26 and in that regard, the central section 12 of the aircraft hull displaces more air. As the hull increases in displacement, there is an increase or gain in buoyancy of 100% of the air displaced, and after the displacement increases sufficiently, the aircraft will start to ascend.

When the aircraft has reached a desired altitude, ascent is stopped by shutting off the burner 82 and by closing off valve 74. Reabsorption of the ammonia gas 44 by the solution within compartment A is prevented unless energization of the compressor 48 within line 46 is initiated, which actually pumps ammonia gas 44 from compartment A to the tank 26. The aircraft 10 has actually changed and assumed a new density and can maintain this new density, and its corresponding altitude position indefinitely with no further energy input. When descent is desired, the ammonia gas 44 within compartment A is pumped by means of pump 48 through line 50 (permitted by check valve 50) to the diffuser 46a, where it diffuses in the solution 52. The ammonia gas readily diffuses in the weak aqua-ammonia solution 52 (or water if all the ammonia has been previously displaced from the solution 52). As the ammonia is reabsorbed into the solution 52, the displacement of the aircraft hull and in particular section 12 decreases, causing an increase in density of the aircraft and resulting in descent to a lower density altitude. Continued descent results in landing of the craft. When a lower desired altitude is reached or when the landing is effected, compressor 48 is turned off and flow of ammonia gas 44 from compartment A to tank 26 is terminated.

While the present invention makes application of the great absorption affinity of water for ammonia, and employs thermal energy input to the aqua-ammonia solution for driving the ammonia gas from the liquid and permits upon cooling of the water or weak aqua-ammonia solution, the recapture of the ammonia in a reversible, easily controlled system, similar results both in a reversible and non-reversible process may be achieved by using appropriate materials. For instance, in a reversible process, hydrazene which comprises $N_2H_4$ and which normally takes the form of liquid at atmospheric pressure and temperature may be employed as the system working fluid with the hydrazene decomposing under the application of heat to form nitrogen and hydrogen gases. Further, lithium borohydride in powder form may be employed in a non-reversible process which material, when mixed with water, results in a chemical process with hydrogen evolving therefrom. Unfortunately, when using lithium borohydride, while a satisfactory volumetric change can be effected to readily provide a variable density aircraft, there is no known method of reversing the process and recreating the lithium borohydride.

While the invention has been particularly shown and described with reference to a preferred embodiment thereof, it will be understood by those skilled in the art that various changes in form and details may be made therein without departing from the spirit and scope of the invention.

What is claimed is:

1. An autonomous variable density aircraft comprising:
   an aircraft body,
   means defining a variable volume chamber,
   means carried by the aircraft body for selectively and reversibly varying the amount of ammonia gas within said variable volume chamber to vary the density of said aircraft,
   a storage tank carried by said aircraft body,
   a mass of water within said storage tank,
   said ammonia gas varying means comprising means for controlling the flow of ammonia gas from said variable volume chamber to said storage tank for diffusion within said water to form an aqua-ammonia solution,
   means for driving ammonia gas from said aqua-ammonia solution and transporting released ammonia gas from said storage tank to said variable volume chamber,
   said means for feeding ammonia gas from said variable volume chamber to said storage tank comprises a return extending from said variable volume chamber to said storage tank and terminating in a gas diffuser immersed within said solution and said means for driving ammonia gas from said aqua-ammonia solution comprises heater means operatively positioned with respect to said storage tank for heating said aqua-ammonia solution and driving ammonia gas therefrom by increase in temperature of said aqua-ammonia solution.

2. The aircraft as claimed in claim 1, further comprising a closed loop refrigeration circuit for cooling the aqua-ammonia solution within said tank, said closed loop refrigeration system comprising a closed fluid conduit loop connected to said variable volume chamber for permitting ammonia to flow therethrough, and said loop includes in order: a compressor for compressing ammonia gas received from said variable volume chamber, a condenser downstream of said compressor for condensing said high pressure gaseous ammonia, an evaporator coil positioned within said storage tank and immersed within said aqua-ammonia solution, an expansion valve between said condenser and said evaporator coil for expanding said condensed ammonia to effect heat exchange between said ammonia within said evaporator coil and said aqua-ammonia solution within said tank by the latent heat of vaporization of said liquid ammonia passing through said expansion valve, and a heat exchanger intermediate of said storage tank and said variable volume chamber for cooling gaseous ammonia passing through said closed loop from said evaporator back to said variable volume chamber.

3. The aircraft as claimed in claim 1, further comprising a check valve within said return extending from said variable volume chamber to said storage tank for preventing flow of gaseous ammonia from said storage tank to said variable volume chamber through said gas compressor and said aircraft further comprises an ammonia gas supply line coupling said storage tank to said variable volume chamber and valve means within said supply line for selectively controlling the flow of ammonia gas given off by said aqua-ammonia solution by temperature increase thereof from said storage tank to said variable volume chamber.

4. The aircraft as claimed in claim 3, wherein said aircraft body comprises a variable volume articulated vessel comprising a plurality of rectilinear panels hinged joined together along rectilinear edges thereof, at least one flexible sheet within said articulated vessel and sealed along opposed edges to respective, different hinge joined rectilinear rigid panel edges of said vessel to form with said given rigid panels said variable volume chamber and a second variable volume chamber, a mass of hydrocarbon fuel gas carried within said second variable volume chamber and means for feeding fuel gas from said second variable volume chamber to said heater for heating said aqua-ammonia solution within said storage tank.

5. An autonomous variable density, variable volume articulated aircraft comprising:
- an aircraft body including a section formed of four relatively rigid rectangular panels hinge joined along respective rectilinear edges and defining a contractible and expandable diamond shaped aircraft body in cross section,
- non-expandable fluid impervious sheet means having opposed edges sealably joined to respective opposed corners of said diamond shaped body to form with said rigid panels, at least two variable volume chambers,
- a storage tank fixed to said diamond shaped aircraft body along a hinge joint between two of said rigid panels,
- a mass of first gas having a density less than air within one of said chambers,
- a medium for readily absorbing large masses of said first gas within said storage tank to appreciably reduce the volume of said one chamber carrying said gas, the amount of said first gas and said absorbing medium being sufficient to permit a change in density of the aircraft from lighter than air to heavier than air and vice versa,
- means for transporting said first gas from said one chamber to said tank absorption thereof,
- means for selectively driving said gas from said absorbing within said tank to said one chamber for increasing the volume of gas within said compartment and the size of said aircraft body and reduction in density of the aircraft,
- and wherein said medium for absorbing said first gas comprises water, said aircraft further comprising conduit means fluid connecting said one chamber to said storage tank, pump means provided within said conduit means for pumping gas from said one chamber to said storage tank and said conduit means terminating in a gas diffuser within said tank submerged within said water, and wherein said means for driving said gas from said absorbing medium comprises a heater operatively positioned with respect to said tank for heating the solution formed by said water absorbing said first gas to release said gas from said liquid.

6. The aircraft as claimed in claim 5, wherein said first gas comprises ammonia and said aircraft further comprises a closed loop refrigeration system including an evaporator coil positioned within said tank carrying said absorbing medium, a conduit connecting said one chamber in a closed loop with said evaporator coil with said first gas acting as the refrigerant working fluid, and said closed loop comprising, in order from said compartment to said evaporator coil, a refrigeration compressor, a condenser, and an expansion valve such that by expnading high pressure liquid ammonia within said evaporator coil temperature of the liquid within said storage tank lowers to increase the gas absorption characteristics of said medium.

7. The aircraft as claimed in claim 6, further comprising a mass of hydrocarbon fuel gas of a density on the order of that of air within a second chamber and conduit means coupling said second chamber to said heater to allow hydrocarbon fuel gas to be burned to increase the temperature of the liquid within said storage tank for driving off absorbed first gas therefrom.

8. The aircraft as claimed in claim 7, wherein said sheet means comprise a pair of sheets edge joined together to form three chambers and a fixed mass of lifting gas at a lower density than air is carried within said third chamber for creating in the absence of gas within said first and second chambers a density of the aircraft which is slightly heavier than air, and whereby driving of said first gas from said medium within said storage tank readily changes the density of said aircraft from heavier than air to lighter than air to automatically effect aircraft ascent.

9. The aircraft as claimed in claim 8, further comprising an internal combustion engine, propulsion means mounted to said aircraft body and conduit means fluid coupling said second chamber carrying said hydrocarbon fuel gas to said engine, whereby the fuel gas within said compartment powers both said heater associated with said liquid medium storage tank and the internal combustion engine propulsion means.

* * * * *